United States Patent
Kanoh et al.

Patent Number: 5,273,421
Date of Patent: Dec. 28, 1993

[54] INJECTION TYPE MOLDING MACHINE FOR PRODUCING HOLLOW DOUBLE WALL TYPE PLASTIC ARTICLES

[75] Inventors: Yoshiaki Kanoh; Yukinori Kohama, both of Ube, Japan

[73] Assignee: UBE Industries, Ltd., Yamaguchi, Japan

[21] Appl. No.: 6,150

[22] Filed: Jan. 19, 1993

Related U.S. Application Data

[63] Continuation of Ser. No. 705,966, May 28, 1991, abandoned.

[30] Foreign Application Priority Data

May 29, 1990 [JP] Japan ................. 2-137163
Jun. 29, 1990 [JP] Japan ................. 2-169860

[51] Int. Cl.⁵ ............................................. B29C 49/06
[52] U.S. Cl. ................................. 425/466; 425/467; 425/532; 425/533; 425/557
[58] Field of Search ........ 425/532, 533, 461, 466–468, 425/133.1, 557

[56] References Cited

U.S. PATENT DOCUMENTS

| | | | |
|---|---|---|---|
| 3,317,955 | 5/1967 | Schurman et al. | 425/532 X |
| 4,185,954 | 1/1980 | Murakami et al. | 425/133.1 X |
| 4,201,534 | 5/1980 | Phipps | 425/461 |
| 4,298,325 | 11/1981 | Cole | 425/133.1 X |
| 4,798,528 | 1/1989 | Hattori et al. | 425/461 X |

FOREIGN PATENT DOCUMENTS

| | | | |
|---|---|---|---|
| 58-96528 | 6/1983 | Japan | 425/532 |
| 62-174128 | 7/1987 | Japan | 425/532 |
| 62-251104 | 10/1987 | Japan | |
| 62-267105 | 11/1987 | Japan | |

Primary Examiner—Richard L. Chiesa
Attorney, Agent, or Firm—Finnegan, Henderson, Farrabow, Garrett & Dunner

[57] ABSTRACT

An improved injection blow molding machine has an melt accumulator or melt metering chamber and a vertically extending oval type die communicating therewith for injecting an elliptical annular parison through the die, which is to be blow molded to produce a hollow double wall type article. The oval type die includes a die housing and a mandrel mounted therein to define a melt passage therebetween having a die lip or opening of a four sided elliptical annular profile at a free lower end of the die. The accumulator is in direct contact with the mandrel, and/or the die housing is enlarged in a horizontal direction at a lower end portion thereof. Preferably the enlarged lower end portion is formed by a plate part fixed to a block part forming an upper portion of the die housing. More preferably, the plate part is fixed to the block part in a vertical direction but is allowed to horizontally move to some extent, and is provided with plural pairs of bolts and nuts for adjusting the die lip in a horizontal width direction with the each pair of opposite bolts being fixed to opposite margin portions of the plate part and biasing the block part against each other.

4 Claims, 6 Drawing Sheets

INJECTION TYPE MOLDING MACHINE FOR PRODUCING HOLLOW DOUBLE WALL TYPE PLASTIC ARTICLES

This application is a continuation of application Ser. No. 07/705,966, filed May 28, 1991, now abandoned.

BACKGROUND OF THE INVENTION

1. Field of the Invention

The present invention relates to an improved injection type blow molding machine, particularly to an an oval type die of the machine whereby a plasticizing material is injected through the die to provide a parison having an elliptical annular profile in a horizontal cross-sectional view. The parison is blow molded to produce a hollow double wall type plastic article having a basically concave, convex or bowl shape or a panel shape with a hollow double wall.

2. Description of the Related Art

A blow molding process using an extruding machine or an injection machine with a die having a circle die lip through which a parison having a circular profile in a vertical cross-sectional view is well known as a method of producing a hollow plastic article with a solid wall.

Recently, a modified blow molding process of producing a hollow plastic article with a hollow double wall, using an injection machine or an extruder with a an oval type die has been developed.

A conventional oval type die is designed so as to provide a parison having an elliptical annular profile in a horizontal cross-sectional view, rather than the circular profile used for the solid wall type hollow article. In this connection, the oval type die has a die lip or a die outlet at a lower end thereof having a four sided elliptical annular profile, which is rotated symmetrically about a vertical axis of the die. The profile has one pair of opposite sides which are linear and in parallel with each other, with a narrower width therebetween, and another pair of opposite sides which are convex, preferably semi-circular, with a longer width therebetween at the tops thereof. The oval type die is provided with a melt passage therein for communicating with a machine body and the die lip, and this passage has a profile, at the periphery thereof in a horizontal cross-sectional view, similar to that of the die lip.

It is known that the oval type die is defective when used with an injection machine, in that it is apt to provide a parison having an elliptical annular profile with a wall thickness which locally varies. This local thickness variation occurs due to a local deformation of the die, which leads to a local deformation of the die lip due to a high pressure, e.g., 500 kg/cm² or more, of a plasticized material injected into the die. A parison having an uniform thickness produces a good blow molded article, whereas a parison having a locally varied thickness produces a defective article, in that it is locally weakened and/or is deformed relative to a profile of a mold cavity.

The deformation of the die lip is apt to occur at the linear sides of the die lip because the linear sides are bulged outward by the high pressure of the material at the centers thereof, and thus become, convex. Due to the above deformation, a die lip width of one of the linear sides is often larger than that of the other linear side.

Despite the above-mentioned problems, the injection type blow molding with the oval type die is critical when wishing to produce hollow double wall type articles having superior physical or mechanical properties such as a strength, a surface hardness, a thermal resistance, a weather resistance or the like, thereof. This is because such articles are made of an engineering plastic, as a plastic material, which has a characteristic such that a melt thereof is solidified at a high speed or velocity, compared with a normal plastic used in a extrusion type blow molding. In this regard, an injection machine must be used, to thus overcome the high speed solidifying characteristic of the engineering plastic.

It is known that there is a simple method of preventing the deformation of the die lip of the oval type die for use in the injection type blow molding, wherein the die per se is reinforced as a whole by an increase of a horizontal width thereof Nevertheless, this method is defective in that the reinforced die is heavier, and accordingly, the injection machine must be reinforced to carry the heavy die at a forward end thereof, which increases costs, and further, the heavy die makes handling difficult. Still further, the reinforced die is defective in that the thermal capacity thereof is accordingly increased, with the result that an increased thermal energy must be used to keep it at a desired high temperature. This increases the heating costs incurred for the injection blow molding.

SUMMARY OF THE INVENTION

An object of the present invention is to provide an improved injection type blow molding machine having an oval type die for injecting a parison having an elliptical annular profile to be blow molded for a hollow double wall type plastic article, which overcomes the above mentioned problems.

Another object of the present invention is to provide the above improved die with means for adjusting a die lip gap in a width direction thereof.

According to the present invention, there is provided an injection type blow molding machine having a vertically extending oval type die. The die comprises a die housing having a bore and a mandrel mounted in the housing, to define therebetween a vertically extending melt passage, with a die lip or outlet at a lower end of the housing. The melt passage and the die lip have elliptical annular profiles in a horizontal cross-sectional view. The profile of the die lip is a four sided profile having one pair of opposite sides which are linear and parallel with each other with a narrower width therebetween and another pair of opposite sides which are convex with a longer width therebetween at the tops thereof.

The die housing has a lower portion where the die lip is formed, which portion is enlarged in the horizontal direction relative to an upper portion of the die housing. Preferably, the die housing is embodied, for example, such that it has a vertical cross-sectional profile of a reverse T shape.

A machine body has a melt accumulator or a melt metering chamber at a forward end thereof, and the mandrel is detachably fixed to the accumulator to thereby enable a plasticized material to be directly introduced into the melt passages of the die from the accumulator, through a melt passage formed in an upper portion of the mandrel.

With a conventional oval type die (see FIG. 5), a corresponding die housing is directly connected to a melt accumulator of an injection blow mold machine, and thus is apt to be deformed by a high pressure of a plasticized material such that a corresponding melt passage of the die is bulged horizontally outward at a side near to the accumulator, with the result that more material is allowed to flow in the melt passage at the bulged side than at the opposite side, and thus provides a parison having a wall thicker at a side corresponding to the bulged side of the melt passage than at the opposite side.

Because the mandrel is directly fixed to the accumulator, a deformation of the die of the present invention is prevented as such, and thus it is ensured that the plasticized material is allowed to flow uniformly over the periphery of the mandrel or the melt passage.

Preferably, when the mandrel is directly fixed to the machine body, the die housing comprises an upper block part and a lower plate part having the die lip, both being connected coaxially and having a rectangular shape in a horizontal cross sectional view. The lower plate part has a vertical length shorter than that of the upper block part but has a width, in the direction of the narrower width of the die lip or traversing the parallel linear sides of the die lip, longer than a corresponding width of the upper block part.

Preferably, the lower plate part has a width, in the direction of the longer width of the die lip, longer than a corresponding width of the upper block part.

With the above relationship between the upper and lower parts of the die housing, a lower portion of the die housing, i.e., the lower plate part, having the die lip formed coaxially therein is obviously reinforced against deformation due to the high pressure of the injected plasticized material, compared with a prior art oval type die consisting of a single block die housing having the same width over the length thereof as that of the upper block part of the present invention or another prior art die (see FIG. 5) consisting of an upper block part and a lower plate part, both having the same width as that of the upper block part of the present invention. This reinforcement is attained while ensuring that any increase in the weight of the die housing, in total, is restrained as much as possible.

With the longer width in the direction of the narrower width of the die lip, the lower plate part has opposite margin portions extending horizontally outward from the upper block part. Preferably, the opposite margin portions of the lower plate part are provided with at least one pair of opposite means for adjusting a gap of the die lip defined between the lower plate part and the mandrel in a width direction. Preferably, the opposite die gap adjusting means are a screw and nut type with the nut connected to the lower plate part, and biasing the upper block parts horizontally against each other. In this case, with the die gap adjusting means, the lower plate part must be fixed to the upper block plate in a vertical direction but must be allowed to move horizontally relative to the upper block part, to some extent. This connection of the lower plate part to the upper block plate may be effected by stepped bolt-nut means. The die gap adjusting means may be also operated to precisely position the lower plate part relative to the mandrel fixed to the upper block part.

BRIEF DESCRIPTION OF THE DRAWINGS

FIGS. 5 and 6 are vertical cross-sectional views showing a conventional injection blow molding machine corresponding to that of FIG. 1 or 3, particularly a conventional combination of an oval type die and a melt accumulator, wherein FIG. 5 shows a normal state of the die and FIG. 6 shows an abnormal state of the die.

DESCRIPTION OF THE PREFERRED EMBODIMENTS

Embodiments of the present invention directed to an injection blow molding machine, particularly a combination of an oval type die and a melt accumulator of the machine for producing a hollow double wall type article, will be described in comparison with prior arts and with reference to FIGS. 1 to 6.

Figure 1:
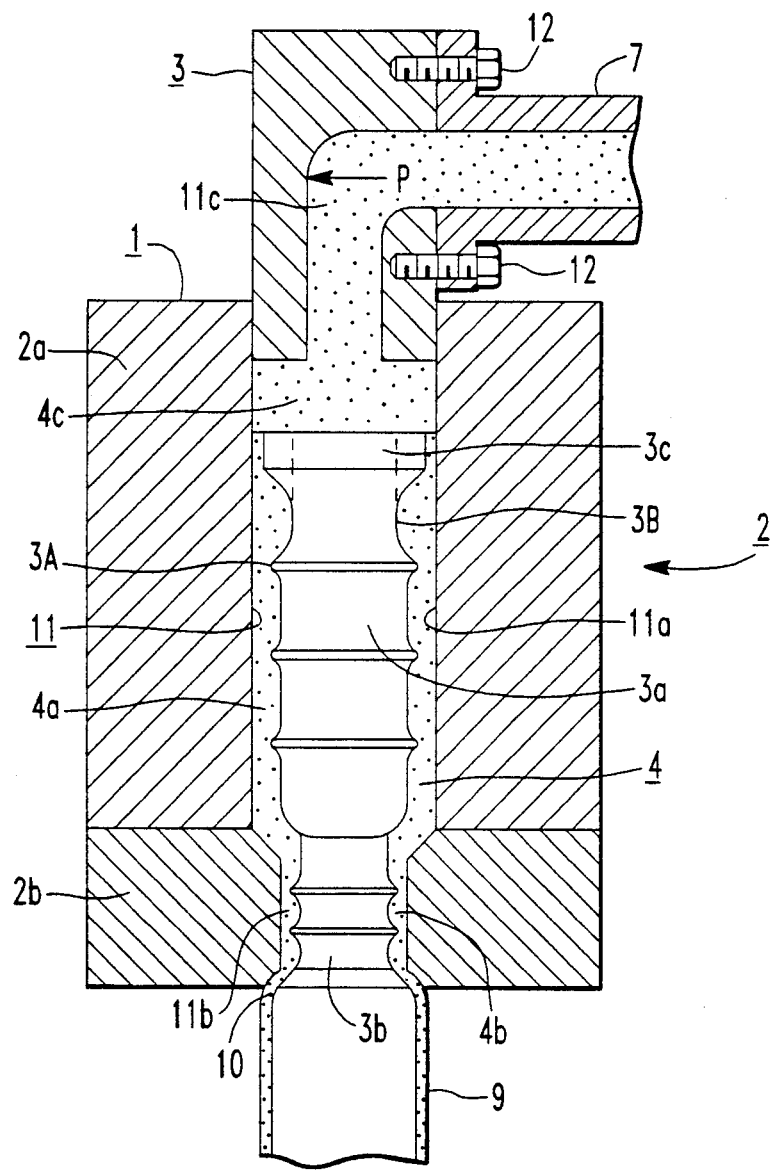
FIG. 1 is a vertical cross-sectional view showing a first embodiment of the injection blow molding machine of the present invention, particularly an oval type die and a forward end of a melt accumulator of the machine.
Figure 2:
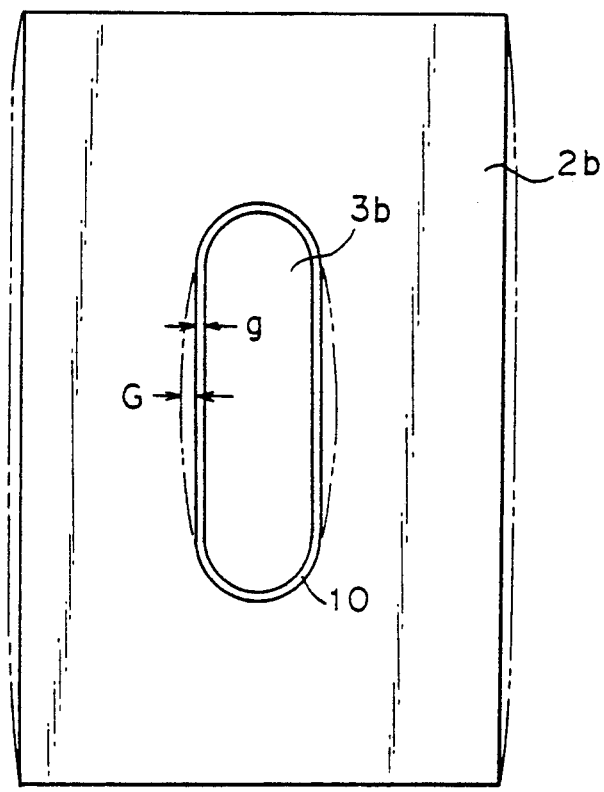
FIG. 2 is a bottom view of the die as shown in FIG. 1.

Referring to FIGS. 1 and 2, a first embodiment of the die 1 of the present invention comprises a die housing 2 and a mandrel 3. The die housing 2 has a peripheral wall defining an axial bore 11, and consists of an upper block part 2a and a lower plate part 2b. Both of the parts 2a and 2b have the same rectangular profile and size in a horizontal cross sectional view, and are combined to form an integrated block extending vertically with horizontal widths in two directions perpendicular to each other, which widths are uniform over the entire vertical length thereof. Particularly, the integrated block has a uniform profile in a horizontal cross-sectional view over the entire vertical length. Both of the parts 2a and 2b have coaxial bore sections 11a and 11b having elliptical four sided profiles in a horizontal cross-sectional view, with one pair of opposite sides being linear and parallel to each other and the other pair of opposite sides being convex or semi-circular. A width between the linear sides of each bore profile is narrower than another width between the semi-circular sides, at the tops thereof.

The mandrel 3 has upper (3c), intermediate (3b) and lower (3c) portions. The upper portion 3c is tightly fitted and fixed to the die housing 2 at a top portion thereof so that the die housing is held by the mandrel 3, and thus a leakage of a plasticized material injected into the bore of the die housing, from the top of the die, is prevented. The intermediate and lower portions of the mandrel 3 have elliptical profiles in a horizontal cross-sectional view, corresponding to those of the bore sections of the die housing parts, respectively, but have multi-waved profiles in a vertical cross sectional view with vertically spaced circumferential bank portions 3A and valley portions 3B therebetween, as shown in FIG. 1.

The die housing 2 and the mandrel 3, in combination, form a melt passage 4 including passage sections 4a and 4b defined therebetween. The passage sections have elliptical annular profiles in a horizontal cross-sectional view, each having one pair of opposite sides which are linear and parallel to each other with a narrower width therebetween and another pair of opposite sides which are semi-circular with a longer width therebetween at centers thereof as shown in FIG. 2. The longer and narrower widths are perpendicular to each other. The multi-waved profile of the mandrel 3 is intended to cause the injected material to flow down through the elliptical annular melt passage 4 with a uniform melt distribution over the periphery of the melt passage.

The melt passage 4 forms a die lip or outlet 10 at a lower free end of the die. Namely, the die lip 10 is formed in the lower plate part 2b in combination with the lower portion 3b of the mandrel 3. The lower mandrel portion 3b may be called a "core" in a narrow sense, and may be a part which is detachably fixed to another part forming the upper and intermediate mandrel portions. In such a case the other mandrel part 3a may be called a "mandrel", in a narrow sense. Each of the die housing parts 2a and 2b may be formed by two halves which are detachably fixed to define the bore sections 11a and 11b.

The upper mandrel portion 3c has a branched melt passage 11c formed therein to communicate with the melt passage section 4c formed in the upper die housing part 2a. The above-mentioned features of the die according to the present invention are the same as those of a conventional oval type die as shown in FIG. 5, where the same or similar numbers denote substantially the same or similar elements or members.

Figure 5:
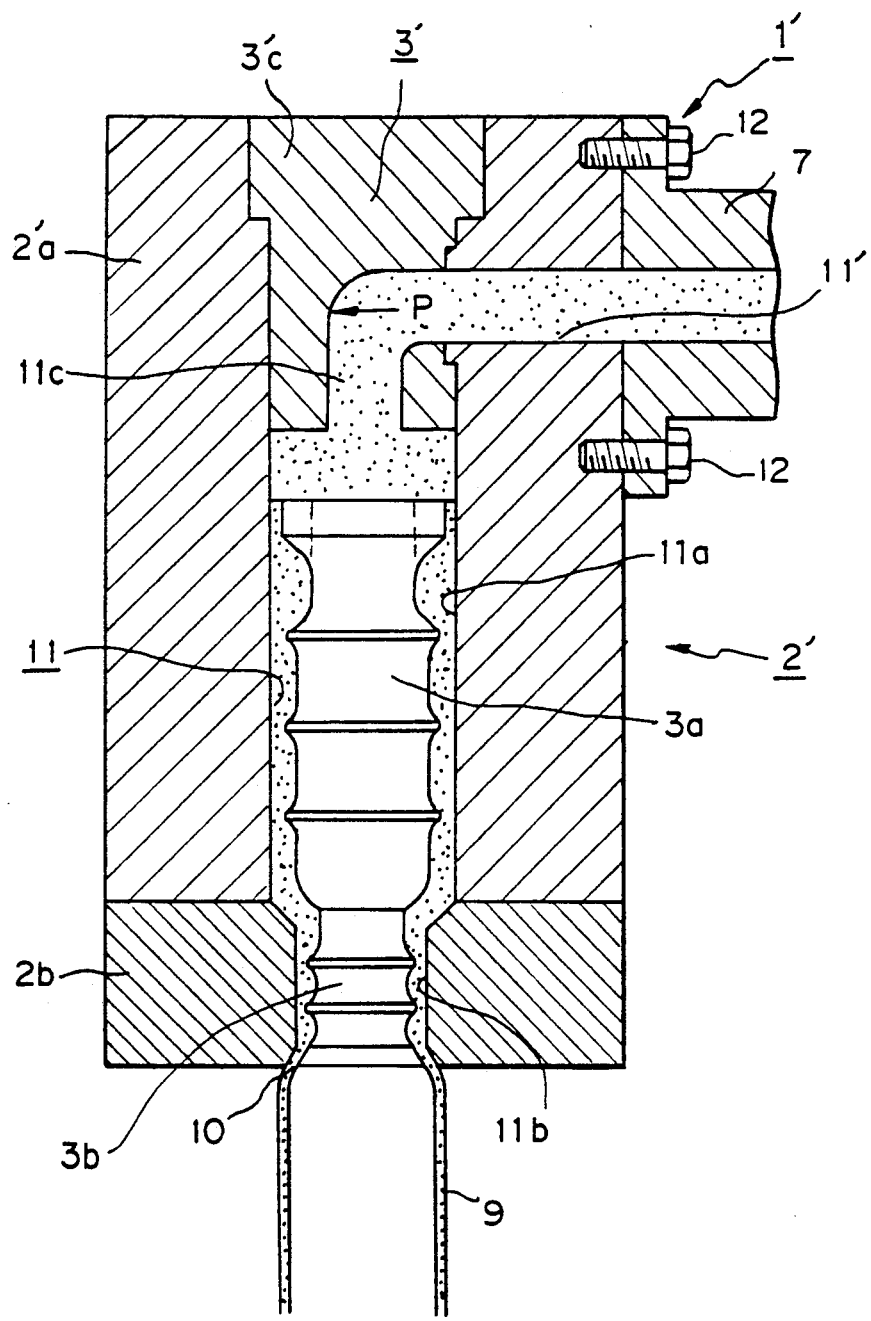

A feature of the embodiment different from the prior art of FIG. 5 is that the upper mandrel portion 3c of the present invention is detachably fixed to a melt accumulator 7 of an injection machine body (not shown) by bolts 12 in a direct manner, so that the accumulator 7 is in a direct communication with the branched melt passage section 11c of the mandrel 3, whereas a corresponding upper mandrel portion 3c' of the prior art is not directly connected to a corresponding accumulator 7, but a corresponding die housing 2' is detachably fixed to the accumulator 7 by bolts 12 in a direct manner so that a corresponding branched melt passage 11c of the mandrel 3' communicates with the accumulator 7 via a horizontal hole 11' formed in a wall of the die housing 2'.

Figure 6:
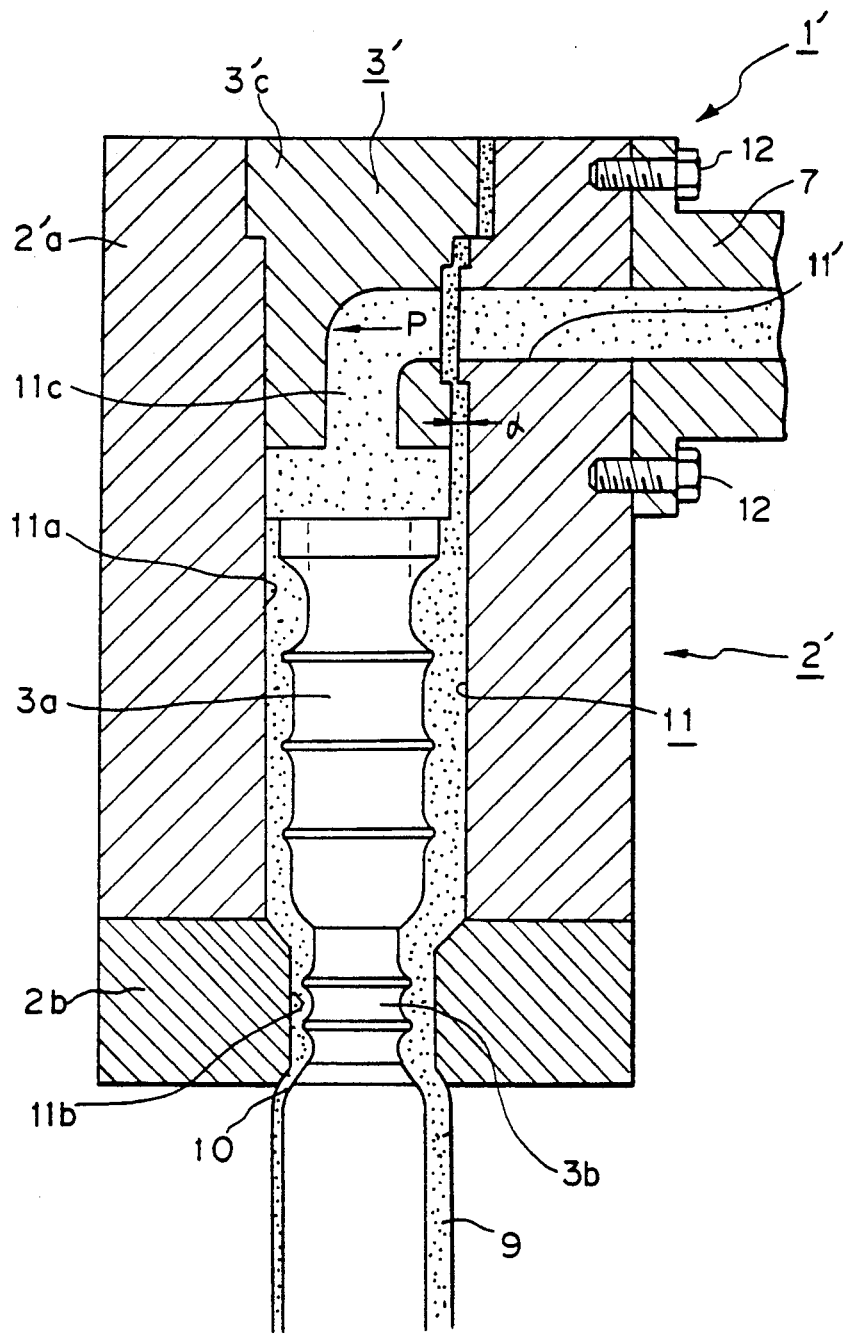

With the conventional combination of the die 1' and the accumulator 7, the inventor recognized that a high pressure of a plasticized material injected from the accumulator 7 into the die 1' is apt to cause a deformation of the die housing 2', such that a gap α between the die wall and the mandrel 3' at a side near the accumulator 7 as shown in FIG. 6 is generated. Such a gap is likely to be larger as shown in FIG. 6 where the horizontal hole 11' of the die housing is formed to extend in a direction traversing the linear sides of the die lip profile, than that where the hole 11' extends in a direction traversing the semi-circle sides of the die lip profile.

The improved combination of the die 1 with the accumulator 7 according to the present invention as shown in FIG. 1 allows the high material pressure to be equally exerted against the die housing wall at opposite sides of the wall, and thus ensures that the plasticized material is forced to flow at the same volume rate through the melt passage sections 4a and 4b at the opposite sides of the die lip profile. As a result, the improved combination ensures that the die lip 10 will produce a parison 9 therethrough having the same thickness at corresponding opposite sides thereof, as shown in FIG. 1.

The inventor recognized that, even if the above improved combination as shown in FIG. 1 is adopted, another kind of deformation of the die housing may occur, as shown in FIG. 2. That is, the die housing 2 may be deformed such that a pair of opposite side walls of the die housing corresponding to the linear sides of the die lip 10 are curved outward in a horizontal cross sectional view as shown in FIG. 2 by chain lines, and thus a die gap g, i.e., a gap between the die housing 2 and the mandrel 3 at the die lip 10, is bulged outward at the linear sides of the die lip profile, as denoted by G. As a result, parison 9 has a thickness, at opposite portions corresponding to the bulged die gap portions, larger than that of the other portions. It is known that the above undesired deformation of the die housing 2 is increased as a width or thickness of the die housing wall traversing the linear sides of the die lip profile is reduced and/or as the larger width of the die lip profile is increased relative to the narrower width thereof.

Figure 3:
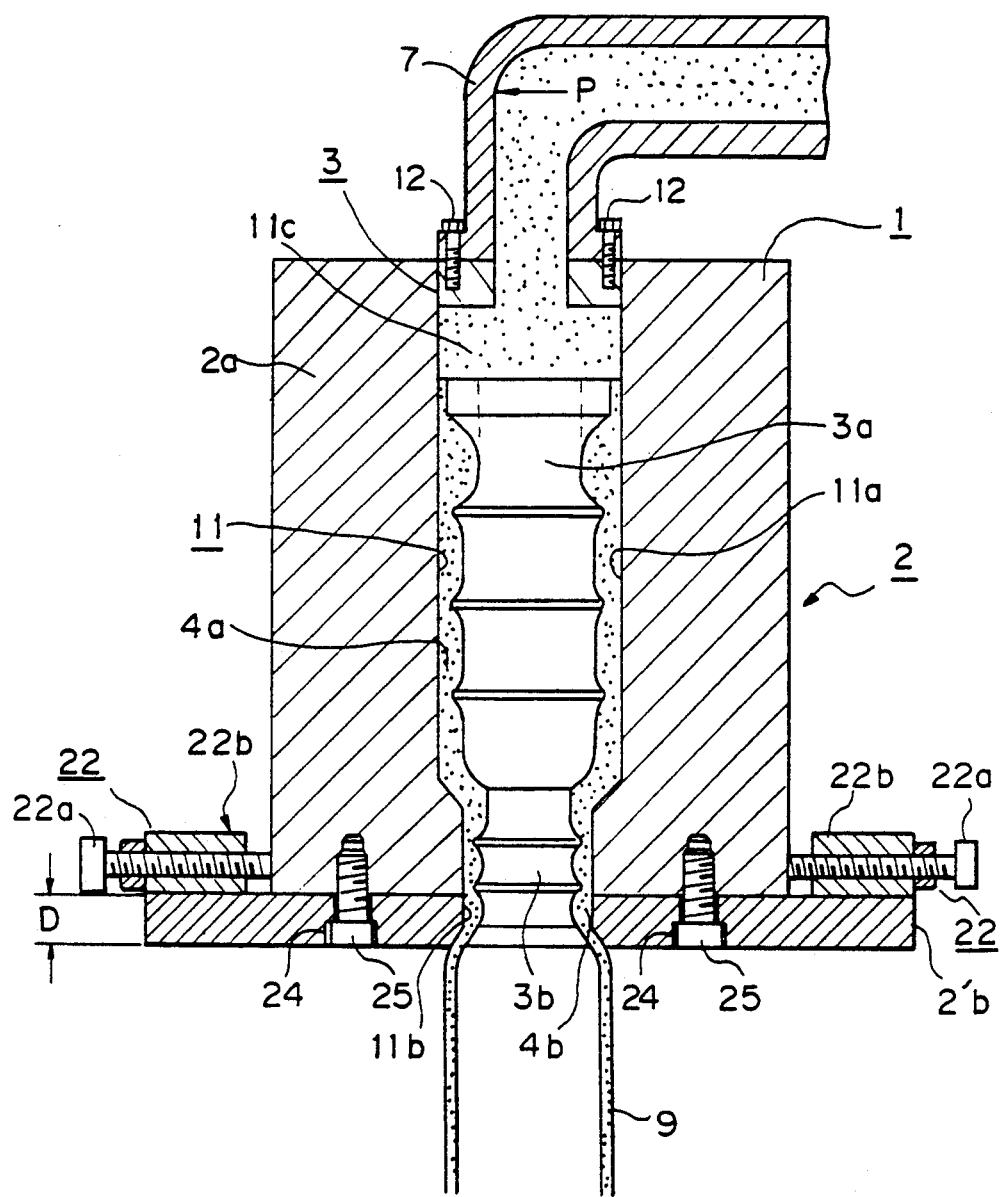
FIG. 3 is a vertical cross-sectional view corresponding to FIG. 1, showing a second embodiment of the injection blow molding machine of the present invention, involving an oval type die and a melt accumulator.

A second embodiment of the present invention as shown in FIG. 3 is provided to prevent an occurrence of the above other kind of deformation, while ensuring that any increase in the weight or volume of the die, in total, is restrained as much as possible.

Referring to FIG. 3, an oval type die 1 of the present invention is the same as that of FIG. 1, except for a corresponding lower plate part 2'b of a die housing 2, which part has a larger width than that of the lower plate part 2b of FIG. 1, and thus has a larger width than that of a corresponding upper block part 2a.

In both embodiments of FIG. 1 and FIG. 3, the maximum width of the bore in the horizontal direction traversing the opposite linear sides of the die lip profile in the lower block 2b or plate 2b' is no larger than that in the upper block part 2a.

Figure 4:
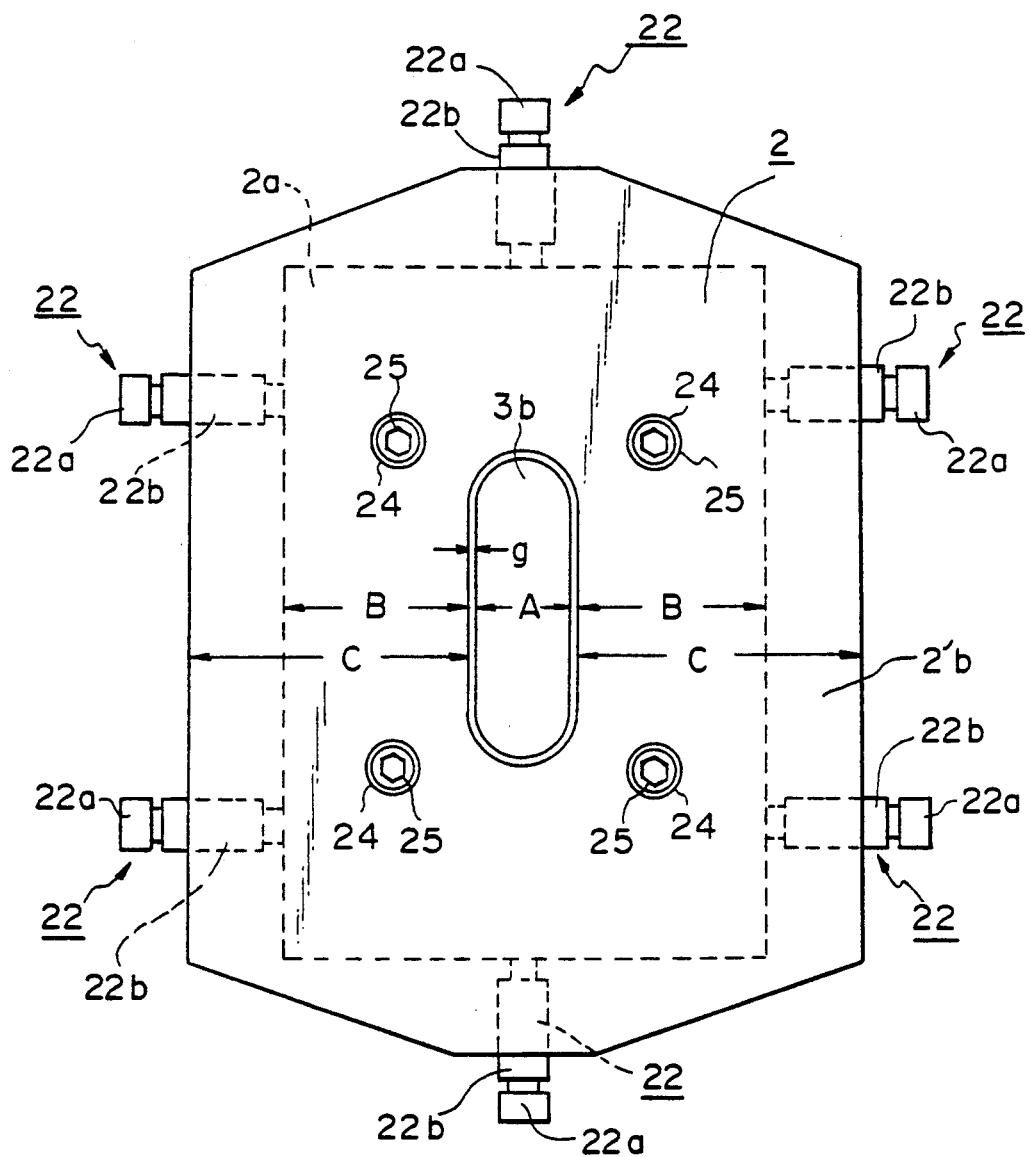
FIG. 4 is a bottom view of the die as shown in FIG. 3.

As shown in FIG. 4, the lower plate part 2'b has a margin portion extending horizontally, outward from and located around the upper block part in a bottom view. As a result, the enlarged lower plate part 2'b is reinforced against the other kind of deformation in a horizontal direction, compared with the corresponding lower plate part 2b of FIG. 1, and a deformation of the die lip profile by the high pressure of the injected material can be accordingly prevented.

The above local reinforcement of the die at the lower plate part 2'b having the die lip 10 is effective as long as the lower plate part 2'b is fixed to the upper block part 2a in the vertical direction. In this regard, it is preferable that the upper and lower parts be combined as such, and to provide the die with a plurality of bolt-nut type die gap adjusting means 22 on the margin portion of the lower plate part 2'b, as shown in FIGS. 3 and 4.

Each die gap adjusting means 22 comprises a bolt 22a and a nut 22b fixed to the lower plate part 2'b at the margin portion thereof. The lower plate part 2'b has vertical stepped holes 24, and bolts 25 having corresponding stepped heads are screwed into the upper block part 2a through the stepped holes 24, respectively. The stepped holes 24 and the stepped head bolts 25 are designated so that the stepped bolt head has a smaller vertical diameter than the stepped hole, at corresponding portions, but a diameter of a smaller diameter portion of the stepped hole 24 is larger than that of a larger diameter portion of the stepped bolt head.

With this design, the stepped bolts 25 can fix the lower plate part 2'b to the upper block plate 2a in a vertical direction while allowing the lower plate part 2'b to move to some extent in a horizontal direction relative to the upper block part 2a.

The belt-nut type adjusting means 22 are arranged in an appropriate spaced relationship as shown in FIG. 4 so that in each pair of opposite adjusting means 22 the bolts 22a bias the upper block parts 2a against each other. Accordingly, the adjusting means 22 are advantageous in that they can position the lower plate part 2'b relative to the upper block part 2a, with the mandrel 3 fixed thereto, so that the die gap g between the lower plate part 2'b and the mandrel 3 at the die lip 10 can be adjusted as desired.

With the adjusting means 22, the thickness of the parison 9 to be injected through the die 1 can be controlled. Under special circumstances, preferably a thickness of one of the opposite parison sides is increased relative to that of the other side. In this case, the adjusting means 22 is very effective when used to adjust the thickness as such.

Referring to FIG. 4, roughly speaking, the preferable dimensions of the upper and lower parts of the die housing are as follows. Relative to a narrower width (A) of the mandrel 3 at the die lip 10, a horizontal length from the periphery of the die lip to the outer side surface (B) of the upper part wall in the direction of the width (A) is 1.5 to 2.5 times, more preferably 2 times the width (A), and a horizontal length from the periphery of the die lip to the outer side surface of the lower part wall in the direction of the width (A) is 2.5 to 4 times, more preferably 3 times the width (A). In this case, a vertical thickness (D) of the lower part 2'b is 0.5 to 1.0 time, more preferably 0.7 times the width (A). Of course, such preferable dimensions as shown above are varied according to a pressure of the plasticized material injected into the die, and thus specific dimensions of the die are determined in accordance with a specific pressure of the material.

According to the present invention, the deformation of the die lip profile at the linear sides thereof can be restrained to a level of 0.1 mm or less in a direction traversing the linear sides.

Referring to FIGS. 1 and 3, the improved combination of the oval type die 1 and the accumulator 7 according to the invention is embodied in different ways in FIGS. 1 and 3. In the first embodiment of FIG. 1, the upper portion of the mandrel 3 is extended vertically from the top of the die housing 2, and the accumulator 7 is connected to the upper mandrel portion in a horizontal direction, but in the second embodiment of FIG. 3, the upper mandrel portion is connected to the accumulator 7 in a vertical direction. Both embodiments give an equivalent effect, in that a leakage of the material through a possible annular gap between the die housing and the mandrel at the top of the die is prevented, while the first kind of deformation of the melt passage relative to the mandrel in a horizontal direction as shown in FIG. 6 is prevented.

We claim:

1. In an injection blow molding machine having a melt accumulator and a vertically extending oval die communicating therewith for injecting an elliptical annular parison of a plasticized material through the die, which is to be blow molded to produce a hollow double wall article, the die having a die housing with a vertical bore and a stationary mandrel mounted in the bore, to thus define a melt passage therebetween, forming a die lip at a lower free end of the die through which lip the parison is provided, the die lip having a four sided elliptical annular profile in a horizontal cross-sectional view, with one pair of opposite sides with a shorter width therebetween being linear and parallel to each other and with another pair of opposite sides with a longer width therebetween being convex, the die housing being enlarged in a horizontal direction at a lower end portion thereof with which the mandrel defines the die lip, relative to the other upper portion thereof, an improvement comprising in combination:

(1) said die housing having a rectangular profile in a horizontal cross-sectional view, and being formed by stationary upper and movable lower coaxial separate block parts detachably fixed to each other, with a horizontal length B from the periphery of the die lip to the outer side surface of the upper block part in the direction of a narrow width A of the mandrel at the die lip being smaller than a horizontal length C from the periphery of the die lip to the outer side surface of the lower block part in the direction of the width A, so that the enlarged lower block part has opposite margin portions extending horizontally outward from the upper block part;

(2) a maximum width of the bore in the horizontal direction traversing the opposite linear sides of the die lip profile in the lower block part being equal to or less than that in the upper block part; and (3) means fixed to the opposite margin portions of the enlarged lower block part thereon for horizontally fixing the lower block part relative to both the upper block part and the mandrel at a desired relative position to thereby adjust the die lip in a horizontal width direction, the lower block part being vertically fixed to the upper block part and having means to initially permit said lower block part to move horizontally to an extent relative to the upper block part.

2. An injection blow molding machine according to claim 1, wherein B/A=1.5 to 2.5, C/A=2.5 to 4, and D/A=0.5 to 1.0, where D is a vertical thickness of the lower block part, provided that C/A is larger than B/A.

3. An injection blow molding machine according to claim 2, wherein the adjusting means include a bolt-nut structure with opposite nuts being fixed to the lower block part at the opposite margin portions thereof and with opposite bolts biasing the upper block parts against each other.

4. An injection blow molding machine according to any one of claim 1, 2 or 3, wherein the mandrel is detachably fixed to the accumulator so that the melt passage communicates with the accumulator through another melt passage formed in the mandrel at a top portion thereof.

* * * * *